United States Patent [19]
Olson

[11] Patent Number: 5,636,662
[45] Date of Patent: *Jun. 10, 1997

[54] QUICK CONNECT CARTRIDGE ASSEMBLY WITH PLUG

[75] Inventor: Darwin Olson, Franklin, Tenn.

[73] Assignee: Dana Corporation, Toledo, Ohio

[ * ] Notice: The term of this patent shall not extend beyond the expiration date of Pat. No. 5,429,394.

[21] Appl. No.: 417,836

[22] Filed: Apr. 6, 1995

Related U.S. Application Data

[63] Continuation of Ser. No. 151,880, Nov. 15, 1993, Pat. No. 5,429,394.

[51] Int. Cl.$^6$ .............................. B65D 59/02; F16L 55/10
[52] U.S. Cl. .................... 138/89; 285/23; 285/39; 138/90
[58] Field of Search .......................... 138/89, 90; 285/39, 285/23, 322, 323, 214, 217, 382.4; 29/423, 418

[56] References Cited

U.S. PATENT DOCUMENTS

| | | | |
|---|---|---|---|
| Re. 27,736 | 8/1973 | Muhlner et al. ............... | 29/423 |
| 3,129,726 | 4/1964 | Moore ........................ | 138/90 |
| 3,650,549 | 3/1972 | Pepper ....................... | 285/915 X |
| 3,653,689 | 4/1972 | Sapy et al. .................. | 285/322 X |
| 3,685,860 | 8/1972 | Schmidt ...................... | 285/249 |
| 3,807,027 | 4/1974 | Heisler ....................... | 29/423 |
| 3,830,531 | 8/1974 | Burge ......................... | 285/239 |
| 3,834,742 | 9/1974 | McPhillips ................... | 285/249 |
| 3,907,335 | 9/1975 | Burge et al. ................. | 285/249 X |
| 4,032,177 | 6/1977 | Anderson .................... | 285/249 X |
| 4,240,651 | 12/1980 | Mariaulle ................... | 285/39 |
| 4,722,560 | 2/1988 | Guest ......................... | 285/323 |
| 4,915,136 | 4/1990 | Bartholomew .............. | 138/89 |
| 5,224,515 | 7/1993 | Foster et al. ................. | 138/89 |
| 5,230,539 | 7/1993 | Olson ......................... | 285/323 |

FOREIGN PATENT DOCUMENTS

| | | | |
|---|---|---|---|
| 633854 | 2/1962 | Italy .......................... | 138/89 |
| 1247383 | 9/1971 | United Kingdom .......... | 138/89 |

*Primary Examiner*—David Scherbel
*Assistant Examiner*—Patrick F. Brinson
*Attorney, Agent, or Firm*—Millen, White, Zelano, & Branigan, P.C.

[57] ABSTRACT

An assembly includes a quick connect cartridge which is inserted into a port of a valve or manifold in a pneumatic system for coupling external fluid lines of the system to the valve or manifold. The components of the quick connect cartridge and the O-ring seal are mounted on the tubular shank of a plug. The plug is used as a shipping pin and is also used to install the components into a port of the valve or manifold. Normally, the plug is withdrawn from the port after the components are inserted in the port. If it is desired to keep the port closed after initial installation of the components, the plug may be retained in the port until it is time to connect the port. If it is desired to leave the port permanently closed, the plug remains in place. The plug can be an open plug allowing testing of the valve in which case a dust plug is provided for shipping puposes.

7 Claims, 2 Drawing Sheets

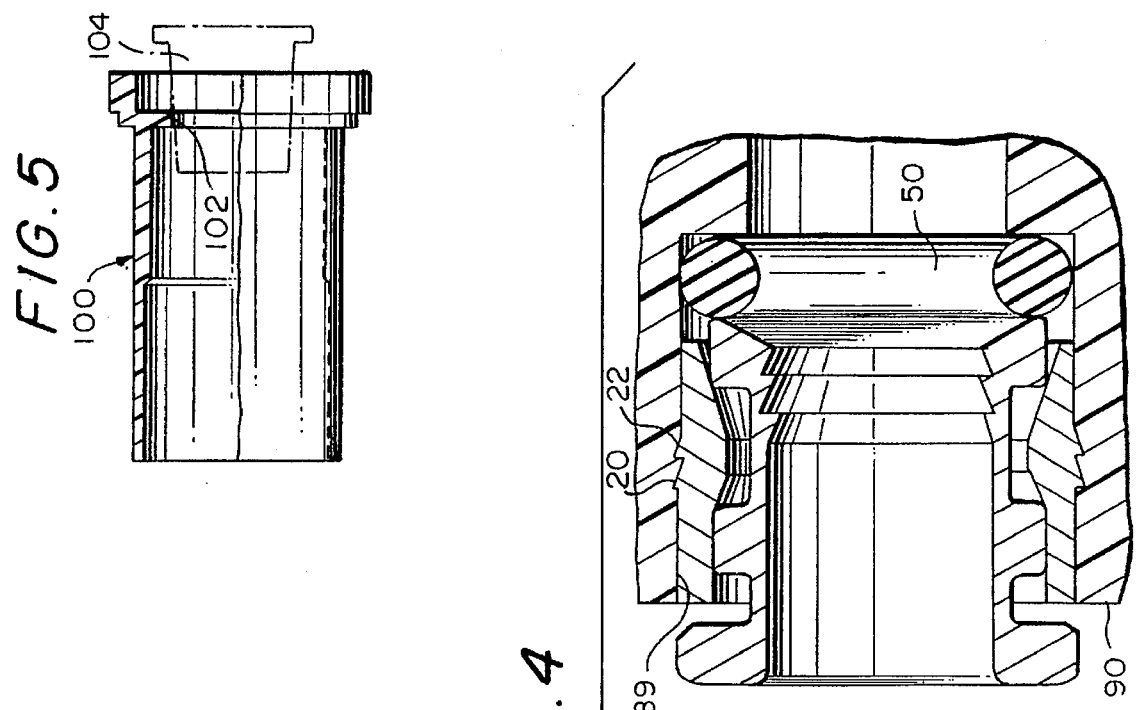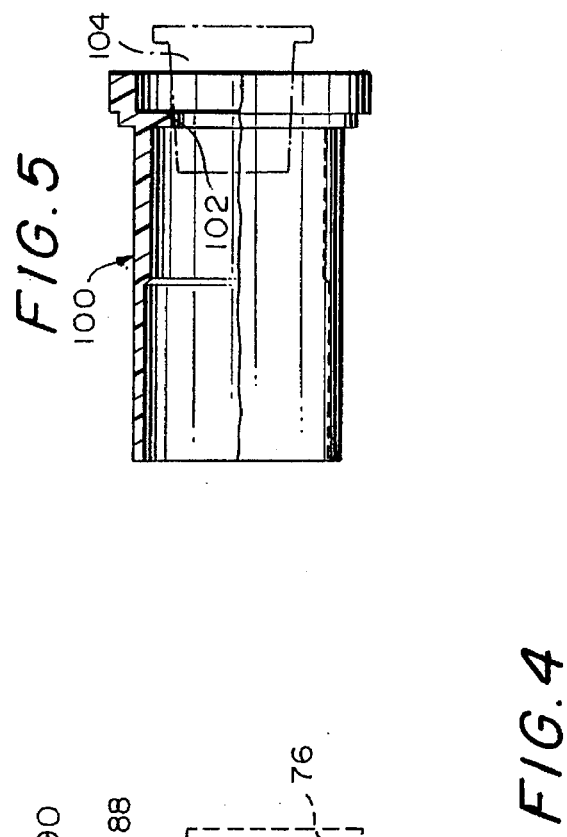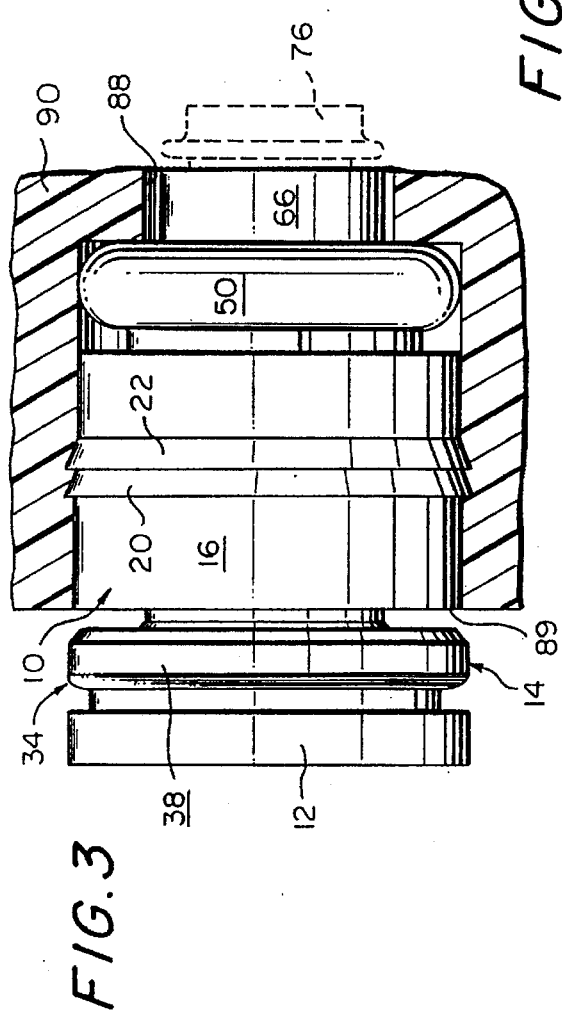

5,636,662

QUICK CONNECT CARTRIDGE ASSEMBLY WITH PLUG

This is a continuation of the application Ser. No. 08/151,880 filed Nov. 15, 1993, now U.S. Pat. No. 5,429,394.

FIELD OF THE INVENTION

The present invention relates to a quick connect cartridge assembly with a plug. More particularly, the present invention relates to a quick connect cartridge assembly with a plug wherein the plug performs a plurality of functions.

BACKGROUND ART

Fittings, valves and manifolds used for various purposes such as controlling air brakes on trucks, are mounted in valve fittings or manifold bodies which have ports for connecting fluid lines thereto. In order to minimize manufacturing expense, reduce assembly errors and expedite assembly, the fluid lines are coupled to the ports by utilizing what are referred to as "quick connect cartridges". In the truck manufacturing industry, these couplings are referred to as "air brake quick connect cartridges". The couplings allow an assembler to make connections in air brake systems by simply [isjomg the connector of an outside hose into the air brake quick connect cartridge after the cartridge has been mounted within a port of a valve or fitting manifold.

Quick connect cartridges typically include outer brass rings which receive brass collars therein and are sealed with rubber, O-ring seals. Typically, the rubber O-ring seal is inserted in the port first and then the brass ring/brass collar is inserted as a subassembly. When a tube support is required, the tube support is inserted through the cartridge subassembly and the O-ring, after the subassembly and O-ring are installed in a port.

In according with prior art practices, the cartridge subassembly and O-ring are shipped on a shipping pin. If it is desired to keep the port of the valve fitting or manifold closed, the shipping pin cannot be used since it is not configured for optional, continued use as a plug; nor is the shipping pin configured for use as a tool for easy, accurate cartridge installation. In addition, a tube support is optionally used in a number of installations and the shipping pin is not configured to accommodate tube supports.

Fabrication of manifolds, fittings and valves used for systems such as air brakes is complicated by the practice of manufacturing and assembling different components at various locations. For example, manufacturers of manifolds and valves do not ship until the cartridge subassemblies arrive from another factory and are installed by the manufacturer. When valves are transported to vehicle assemblers, it is the general practice to keep the ports of the valve plugged until the valves are connected with outside fluid lines. The valves and manifolds are then unplugged and fluid lines connected thereto. In that a number of entities and people are involved in this assembly process, there are numbers of situations in which errors and delay can occur. Accordingly, there is a need to provide an arrangement for simplifying the assembly and shipping process in order to minimize the occurrence of mistakes by providing an arrangement for air brake quick connect cartridge assemblies which is convenient, inexpensive and faster than the procedures currently practiced.

SUMMARY OF THE INVENTION

It is a feature of this invention to provide a mounting plug for retaining a quick connect subassembly thereon and for use as a tool for installing the quick connect subassembly.

In view of this feature, the present invention is directed to an arrangement for retaining an assembly of components utilized to provide a fluid coupling in a port, wherein the components include a ring, a collar disposed within the ring and an O-ring all coaxially disposed with respect to one another. The arrangement includes a plug having an outer diameter substantially equal to the inner diameter of the collar wherein the plug is slidably received within the collar and is held within the collar by a friction fit. The plug is also received through the O-ring so as to establish a coaxial relationship with the ring, collar and O-ring. The plug is configured to facilitate driving the components into the port and has structure facilitating removal of the plug from the components after the components have been seated in the port.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein:

FIG. 3 is a side elevational view showing the assembly of FIGS. 1 and 2 installed in a port of a valve or manifold housing;

FIG. 4 is a view similar to FIG. 3, but showing the plug being removed from the assembly; and FIG. 5 is a view of a second embodiment of the plug.

DETAILED DESCRIPTION

The Subassembly 10

Figure 1:
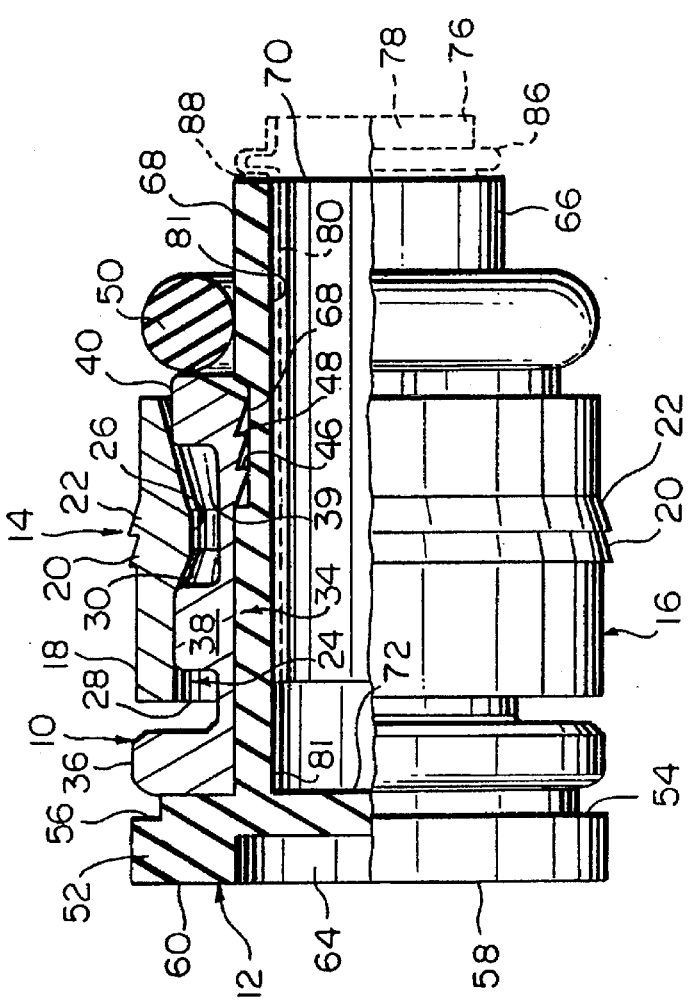
FIG. 1 is an enlarged side elevation of a quick connect assembly with a plug, configured in accordance with the principles of the instant invention.

Referring now to FIG. 1, there is shown a cartridge subassembly 10 with a plug 12 which combined with the subassembly to form a cartridge assembly 14, configured in accordance with the instant invention. The cartridge subassembly 10 includes an outer brass ring 16 having an outer surface 18 with a pair of externally facing annular barbs 20 and 22 thereon. The brass ring 18 has an inner cylindrical surface 24 with an inner annular rib 26. The inner surface 24 includes a front surface 28 which is cylindrical, an intermediate frustoconical surface 30 rising to the rib 26, and a rear frustoconical surface 32 which tapers away from the rib in the opposite direction.

The brass ring 16 retains a brass collar 34 mounted coaxially therein. The brass collar 34 includes front flange 36 and intermediate shoulder 38 and a rear shoulder 40. The intermediate shoulder 38 engages the front, inner cylindrical surface 28 of brass ring 16, while the rear shoulder 40 engages the rear conical surface 32 of the brass ring with the rib 26 of the brass ring being received in a space defined between the intermediate shoulder 38 and rear shoulder. The collar 34 has a cylindrical inner surface 44 which has a pair of teeth or barbs 46 and 47 facing inwardly.

Proximate the brass ring 16 and brass collar 34 is a rubber O-ring seal 50 which abuts the rear shoulder 40 of the brass collar. The O-ring seal 50 has an outer diameter substantially equal to the outer diameter of the brass ring 16 and an inner diameter substantially equal to the inner diameter of the brass collar 34. The brass ring 16, brass collar 34 and rubber O-ring 50 cooperate to provide a quick connect cartridge, known as an air brake quick connect cartridge, when inserted into a housing of a manifold, fitting or valve (see FIG. 3).

The Plug 12

In accordance with the principles of the instant invention, the brass ring 16, brass collar 34 and rubber O-ring 50 are mounted on a plug configured as the plug 12. The plug 12 is preferably made of a resinous material and is glass filled. For example, the plug 12 may be made of CAPRON 8231 which is 12% glass filled. The plug 12 includes an end flange 52 which has a step 54 with a radial surface 56. The end flanges 52 of the plug 12 abuts the end flange 36 of the brass collar 34.

Figure 2:
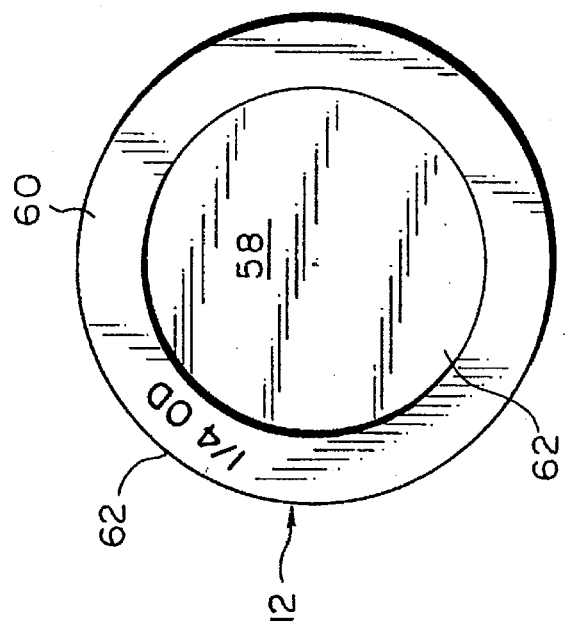
FIG. 2 is a front view of the assembly of FIG. 1.

As is seen in FIG. 2, the plug 12 has an end face 58 with an annular, raised portion 60 having indicia 62 thereon which identifies the plug and identifies its diameter. For example, if the brass collar 34 of the cartridge subassembly has an inside diameter of ¼ inch so as to receive a ¼ inch coupling of an outside line, then the flange 60 is marked with indicia 62 which says, "¼ O.D.". Surrounded by the annular ring 60 is a cavity 64 which serves to assist in locating a punch or other tool used to drive the plug 12 and cartridge assembly 10 home during insertion into a port of a manifold or valve. The plug 12 has a tubular shank portion 66 having an outer surface 68 which force fits into the brass collar 34. The shank 66 is held within the brass collar 34 by the barbs 46 and 47 which extend inwardly from the collar and bite into the resin surface of the shank so as to removably retain the plug 12 within the collar 34. Optionally, the plug 34 may have a groove 69 for receiving the barbs 46 and 47 projecting from the brass collar 34.

In the embodiment of FIG. 1, the recess portion 64 is defined by an end wall 72 which closes the tubular shank 66. At its other end 70, the tubular shank 66 is open. In accordance with one embodiment of the invention, the open end 70 of the shank 66 receives a tube support (dotted lines 76) therethrough. The tube support 76 has a large diameter 78 and a smaller diameter portion 80 with the smaller diameter end portion being received within the tube 66 and held therein by ribs 81. The larger diameter end 78 is joined to the smaller diameter portion 80 by a substantially U-shaped fold 86 which is juxtaposed with the flat radial end surface 88 of the shank portion 66 of plug 12.

Mounting of the Quick Connect Cartridge and Plug Assembly in a Manifold or Valve Referring now to FIG. 3, the quick connect, cartridge-plug assembly 14 is shown mounted in a bore 89 of a molded body 90 comprising a housing for a valve or manifold (not shown) used with, for example, air brakes (not shown). The molded body 90 is preferably made of a resinous material which is substantially softer than the brass comprising the brass ring 16. Accordingly, the assembly 14 is mounted within a bore 89 by a force fit in which the brass ring slides on the cylindrical surface of the bore 89 with the annular barbs 20 and 22 on the brass ring preventing withdrawal of the subassembly 10.

In accordance with the principles of the instant invention, the plug 12 assists in the installation of the subassembly 10 comprised of the brass ring 16 and brass collar 12, as well as the rubber O-ring 50 by retaining these components assembled on the tubular shank 66 as the components are mounted within the port 89 of a valve or manifold. Optionally, the tube support (dotted lines) 76 is retained within the tubular shank 66 and is inserted simultaneously with the subassembly 10 and O-ring 50 into the port 89.

Referring now to FIG. 4, it is seen that after the subassembly 10 with O-ring 50 are inserted in the port 89, the plug 12 is withdrawn. This is accomplished by a tool (not shown) which grips the plug 12 on the surface 94 on the back side of the flange 52 which forms the annular notch 56. If the tube support 76 is being used, the tube support 76 remains in the port 88 along with the subassembly 10 and O-ring 50 (see FIG. 3). A tapered tool which fits into the annular notch 56 allows one to grip and remove the plug 12.

The Open Plug

Referring now to FIG. 5, there is shown another embodiment in which a plug 100 has an opening 102 through the front end thereof. The opening 102 can be closed by a dust plug 104 during shipping after being used in the same way as the plug 12 of FIG. 3 to mount the subassembly 10 and O-ring 50. With the embodiment of FIG. 5, the opening 102 allows the installer of the assembly to test the assembly prior to shipment. This is accomplished by inserting a conical air nozzle (not shown) in the opening 102 after the assembly has been installed in the port 89 of the molded body 90 and applying pressurized air to test the valve or other element in the body. After the test is conducted, the dust plug 104 is inserted to close the port and the manifold or valve is shipped. Thereafter, the plug 100 is withdrawn in the same manner as the plug 12 is withdrawn (see FIG. 4).

In summary, the plug 12 is used to keep a connecting assembly such as an "air brake quick connect cartridge" together as an assembly during shipping. The plug 12 can then be used to install the cartridge assembly 10 into the ports of pneumatic manifolds, fittings and valves. By having a plug 12 configured as described, the plug easily and accurately locates the cartridge subassembly 10, the O-ring 50 and the tube support 76 during installation. Subsequent to installing the subassembly 10 and O-ring 50, the plug 12 remains in the port as a dust plug during shipping of the manifold or valve or the plug can be used as a seal for spare ports which may be optionally unplugged at final assembly depending on the application.

Finally, as set forth in FIG. 5, the plug 100 has an opening 102 therethrough which facilitates testing, which opening 102 is sealed with a dust plug 104 for shipping of the valve or manifold in which the subassembly is used. Thus, the plug 12 performs at least three functions in combination with the subassembly 10, rubber O-ring 50, tube support 76 and bore 89 of the housing 90.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In an arrangement for retaining an assembly of coaxial components utilized to provide a fluid coupling in a port, wherein the components include: an outer sleeve, a collar having a selected inner diameter and including at least one inwardly projecting barb, the collar being disposed within the outer sleeve, and an O-ring, all coaxially disposed with respect to one another, the improvement comprising:

a cylindrical plug having a shank with an outer diameter substantially equal to the inner diameter of the collar, the shank including an annular groove for receiving the inwardly projecting barb, the shank being slidably received within the collar and being held within the collar by engagement of the inwardly projecting barb, the plug also being received through the O-ring with the O-ring being disposed around a first cylindrical portion of the shank projecting past the collar and outer sleeve so as to establish a coaxial relationship with the sleeve, collar and O-ring; the plug including an end flange on a second cylindrical portion of the shank equal in diameter to the first cylindrical portion for facilitating driving the components into the port, and the end flange having a facilitator for facilitating removing the plug from the components after the components have been mounted in the port with the end flange engaging the collar.

2. The arrangement of claim 1, wherein the outer sleeve and collar are made of brass and wherein the plug is formed of a resinous material.

3. The arrangement of claim 2, wherein the resinous material of the plug is filled with glass fibers.

4. The arrangement of claim 1, wherein the facilitator comprises an annular notch.

5. The arrangement of claim 1, wherein the shank of the plug is tubular, defining a cylindrical space therein.

6. The arrangement of claim 5 wherein a tube support is provided having a large diameter portion and smaller diameter portion with the smaller diameter portion being received within the tube of the shank and the large diameter portion being outside of the tube of the shank.

7. The arrangement of claim 1, wherein the shank of the plug is tubular; wherein the shank is open at both ends to permit the introduction of pressurized test fluid through the plug, and wherein a dust plug is provided for closing the plug subsequent to the introduction of pressurized test fluid therethrough.

* * * * *